United States Patent
Croxford

(10) Patent No.: US 10,713,753 B2
(45) Date of Patent: Jul. 14, 2020

(54) DATA PROCESSING SYSTEMS

(71) Applicant: Apical Limited, Cambridge (GB)

(72) Inventor: Daren Croxford, Swaffham Prior (GB)

(73) Assignee: APICAL LIMITED, Cambridge (GB)

( * ) Notice: Subject to any disclaimer, the term of this patent is extended or adjusted under 35 U.S.C. 154(b) by 0 days.

(21) Appl. No.: 16/159,574

(22) Filed: Oct. 12, 2018

(65) Prior Publication Data

US 2020/0118244 A1 Apr. 16, 2020

(51) Int. Cl.
*G06T 3/40* (2006.01)
*G09G 5/391* (2006.01)
*G06T 1/20* (2006.01)

(52) U.S. Cl.
CPC .............. *G06T 3/4007* (2013.01); *G06T 1/20* (2013.01); *G09G 5/391* (2013.01); *G09G 2340/0407* (2013.01)

(58) Field of Classification Search
None
See application file for complete search history.

(56) References Cited

U.S. PATENT DOCUMENTS

| | | | |
|---|---|---|---|
| 2015/0103071 A1* | 4/2015 | Son | G06T 15/00 345/419 |
| 2015/0379674 A1* | 12/2015 | Golas | G06T 1/60 345/426 |
| 2016/0240000 A1* | 8/2016 | Fishwick | G06T 11/40 |
| 2017/0213388 A1* | 7/2017 | Margolis | H04N 19/139 |
| 2018/0096516 A1* | 4/2018 | Luebke | G06T 15/06 |
| 2018/0284872 A1* | 10/2018 | Schluessler | G06F 1/3265 |
| 2018/0365882 A1* | 12/2018 | Croxford | G06T 15/10 |

* cited by examiner

*Primary Examiner* — Nurun N Flora
(74) *Attorney, Agent, or Firm* — Vierra Magen Marcus LLP

(57) ABSTRACT

A method of operating a data processor when rendering a sequence of frames to produce a sequence of frames for display is disclosed. Each frame represents a view of a scene of one or more objects. The motion of one or more objects is tracked between frames in the sequence of frames. When data for a new frame in the sequence of frames is to be rendered, for a region of the new frame, the method involves determining, based on the tracked motion of one or more objects between frames in the sequence of frames, an amount of motion within the region between frames. The amount of motion is used to assign the region to a category of no, low, intermediate, or high motion. A rendering technique is selected for rendering the region based upon the category to which the region is assigned.

19 Claims, 9 Drawing Sheets

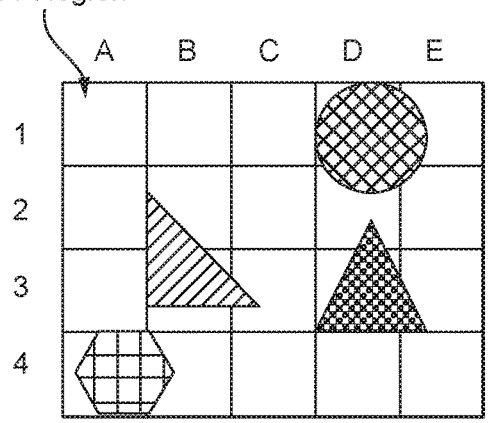
FIG. 8A
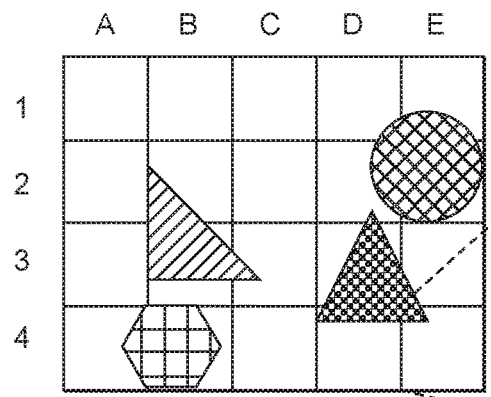
FIG. 8B
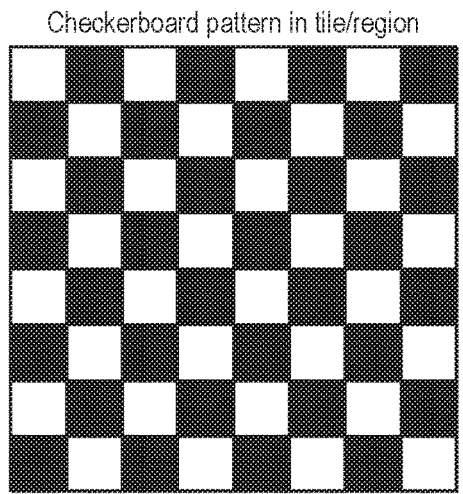
FIG. 8C
FIG. 8D
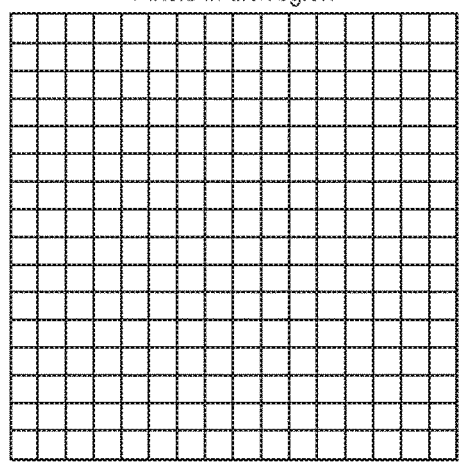
FIG. 8F
FIG. 8E

DATA PROCESSING SYSTEMS

BACKGROUND

The technology disclosed herein relates to data processing systems, and methods of operating such systems, in particular in relation to the display of sequences of frames (images) on a display of a data processing system.

FIG. 1 shows an exemplary system on chip (SoC) data processing system 8 that comprises a host processor comprising a central processing unit (CPU) 1, a graphics processing unit (GPU) 2, a display processor 3, and a memory controller 5. The exemplary data processing system may also comprise a video engine (not shown in FIG. 1). As shown in FIG. 1, these units communicate via an interconnect 4 and have access to off-chip memory 6. In this system, the graphics processing unit (GPU) 2 will render frames (images) to be displayed, and the display processor 3 will then provide the frames to a display panel 7 for display.

In use of this system, an application such as a game, executing on the host processor (CPU) 1 will, for example, require the display of frames on the display panel 7. To do this, the application will submit appropriate commands and data to a driver for the graphics processing unit (GPU) 2 that is executing on the CPU 1. The driver will then generate appropriate commands and data to cause the graphics processing unit (GPU) 2 to render appropriate frames for display and to store those frames in appropriate frame buffers, e.g. in the main memory 5. The display processor 3 will then read those frames into a buffer for the display from where they are then read out and displayed on the display panel 7 of the display.

The data processing system 8 will be configured to provide frames for display, and the graphics processing unit (GPU) 2 will correspondingly be configured to render frames, at an appropriate rate, such as 30 frames per second. Modern electronic devices increasingly use higher resolution displays. For example, displays with a "4k" resolution are becoming more common (a so-called "4k display"). However, providing sequences of frames of the required resolution for display by such devices, at the refresh rate of the display, presents some challenges.

Various rendering techniques have been proposed to allow frames of a resolution and rate required for output, i.e. display, to be produced even where the frame producer, e.g. graphics processor, is unable to produce fully rendered frames at such a resolution and rate. Such techniques typically involve the frame producer generating new data for only a portion of a frame, with some form of processing then being performed to derive additional data to fill in the "missing" data in the remainder of the frame, and provide an output frame of the required level of resolution.

One such technique is known as "upscaling". In this technique, a lower resolution version of a frame is produced i.e. at a resolution level that the frame producer e.g. graphics processor is able to produce at the required rate. Thus, new data is generated in relation to only a portion of the frame. This lower resolution frame is then "upscaled" to provide a frame of a required resolution for output, (e.g. display). The process of upscaling may involve interpolating data in respect of portions, e.g. pixels, for which data has not been generated in the lower resolution version of the frame using the data in respect of adjacent portions e.g. pixels in the same frame.

Another technique which has been proposed more recently is known as "checkerboard rendering". In one example of this technique, for a first frame, new data is generated in respect to one half of the frame, i.e. the black blocks of a checkerboard pattern. In the next (second) frame, new data is generated in respect of the other half of the frame i.e. the white blocks of the checkerboard pattern. In a simple implementation, the "missing" data for any particular frame is based on the existing data generated in relation to the corresponding blocks of the previous frame. Thus, in the example, the data for the black blocks, which is newly generated in respect of the first frame, is used in providing the data for the black blocks in the second frame, along with the newly generated data for the white blocks. In the next frame, the data for the white blocks will be data based on that generated for the previous frame, while the data for the black blocks will be newly generated in respect of the new frame, and so on.

When implementing a checkerboard technique, the "missing" data in respect of certain blocks in a particular frame is based on data (newly) generated in a preceding frame in respect of those blocks. The data may simply correspond to the previously generated data for the blocks, or may be determined using some form of interpolation based on the previously (newly) generated data. In some more recent developments in relation to checkerboard rendering, the "missing" data for certain blocks in a frame is determined by interpolation based on tracking the movement of objects e.g. primitives between frames. It is possible to record the identity of individual objects e.g. primitives within a frame. For example, such functionality is provided by some modern Application Programming Interfaces (APIs), such as Vulkan. The ability to record the identity of individual objects within a frame correspondingly allows those objects to be tracked as they move between frames. Motion vectors may be derived for the objects.

It has been found that using checkerboard rendering in which data (newly) generated in respect of different subsets of blocks in different frames is combined, e.g. using interpolation based on the motion of objects between frames, to produce a frame of a desired resolution for output, may provide an improved version of a frame of a desired resolution level for output than may be achieved simply using an upscaling process based on a lower resolution version of the frame. The checkerboard rendering may thus provide the ability to reduce load on a graphics processor when providing higher resolution output frames, but with better image quality than may be achieved using an upscaling process. It will be appreciated that in an upscaling process, "missing" data is determined based upon newly generated data in the same frame, while in a checkerboard rendering process the "missing" data is determined using data (newly) generated in relation to a preceding frame.

Nonetheless, the Applicant has recognised that there remains scope for improvement in techniques for rendering a sequence of frames to produce a sequence of frames for display.

BRIEF DESCRIPTION OF THE DRAWINGS

Various embodiments of the technology described herein will now be described by way of example only and with reference to the accompanying drawings, in which:

Figures 3A, 3B, 3C, 3D:
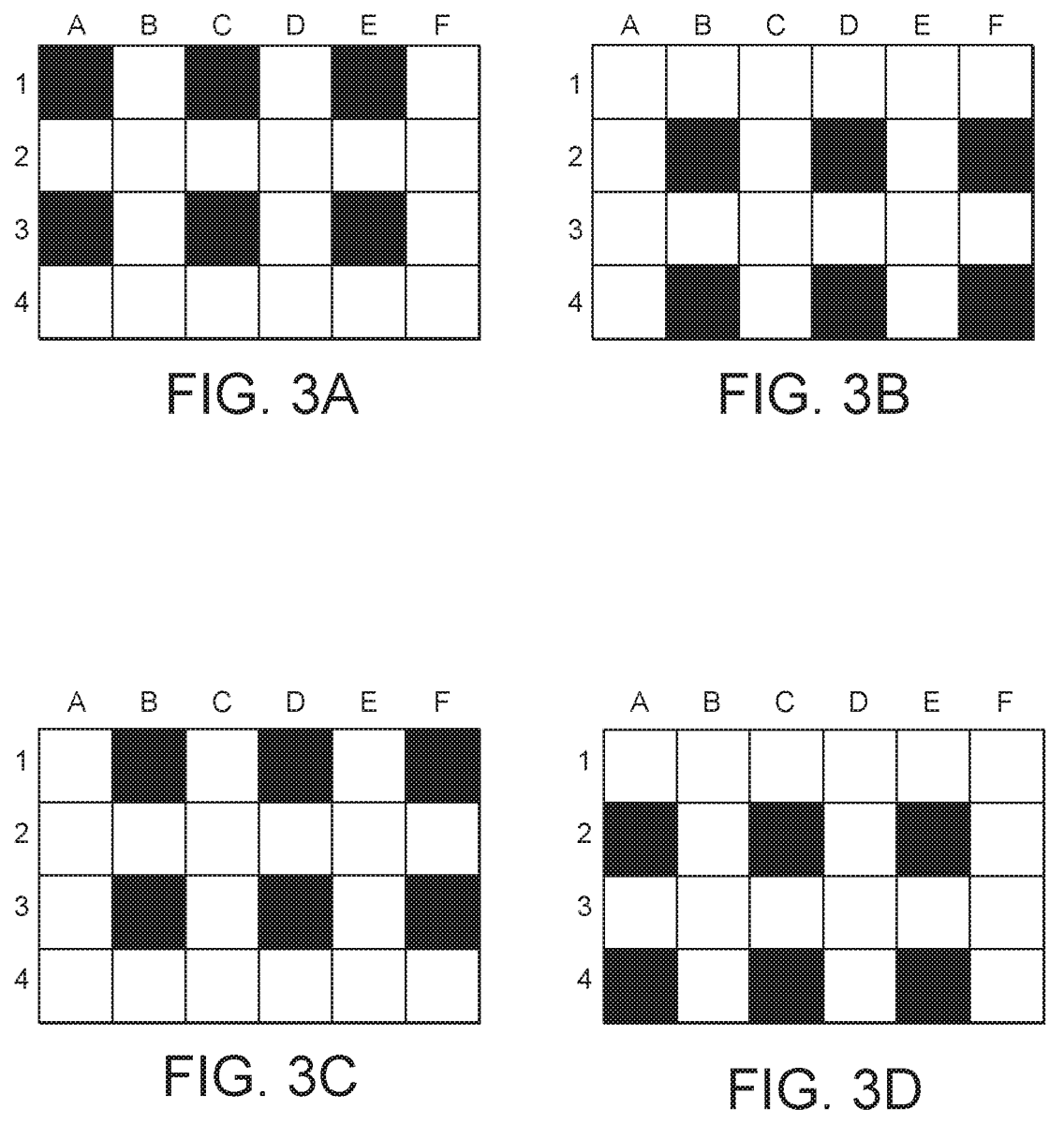

FIGS. 3A-3D illustrate the blocks in successive frames for which new data is generated when performing a lower rate checkerboard rendering technique, with each Figure showing only a portion of the frame;

FIGS. 8A-8C illustrate the way in which tiles within a frame may be assigned to categories in accordance with the technology described herein, based on an amount of motion of polygons within the tiles;

FIG. 8D illustrates the relationship between tiles and checkerboard blocks within the frame shown in FIG. 8B;

FIG. 8E illustrates the relationship between pixels and the checkerboard blocks shown in FIG. 8D;

FIG. 8F shows the rendering techniques selected for each tile based on the amount of motion of polygons therein;

Like reference numerals are used for like components where appropriate in the drawings.

DETAILED DESCRIPTION

Figure 1:
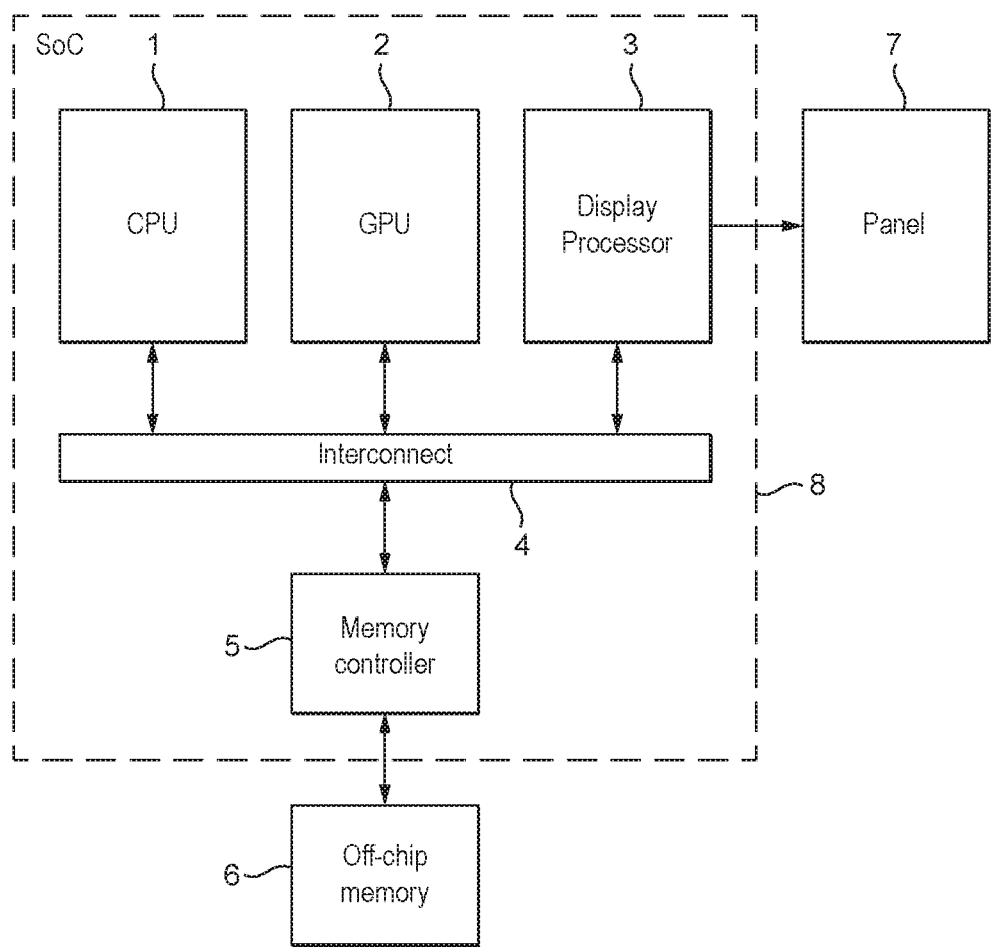
FIG. 1 shows an exemplary data processing system.

In accordance with a first aspect there is provided a method of operating a data processing system that includes a data processor operable to render a sequence of frames to produce a sequence of frames for display, each frame representing a view of a scene of one or more objects;

the method comprising:

tracking the motion of one or more objects between frames in the sequence of frames;

and, when a new frame in the sequence of frames is to be rendered;

for each one of a set of one or more regions of the new frame:

determining, based on the tracked motion of one or more objects between frames in the sequence of frames, an amount of motion within the region between frames;

selecting a rendering technique for rendering the region of the new frame from among a plurality of available rendering techniques based upon the determined amount of motion within the region between frames;

and the data processor rendering the region of the new frame using the selected rendering technique.

Thus, in embodiments, a rendering technique for rendering a region of a new frame is selected based upon a determined amount of motion, (e.g. of one or more objects considered), within the region between frames. This enables the level of rendering effort applied to a given region of a frame to be selected more efficiently. The Applicant has realised that the amount of motion within a region of a frame has an effect on the extent to which a user may notice rendering errors. Thus, the rendering technique selected may be tailored to a particular region based on an amount of motion within the region of the frame. By selecting rendering techniques in respect of region(s) of a frame in this way, a final frame may be provided for output which is of acceptable quality to the user, yet without unnecessarily expending rendering effort.

For example, for a region within which there is relatively little, (or, indeed, no), motion, there are unlikely to be significant changes between frames within that region. Thus, it is possible to use a lower quality i.e. less processing intensive rendering technique for such regions, without significant impact on the overall quality of the region in the final output frame as perceived by a user. Similarly, for regions in which there is a high amount of motion, rendering errors will be less noticeable to the user, as there will be a significant amount of change in the frame region anyway between frames. A lower quality rendering technique may also be used for such regions. However, where there is an intermediate amount of motion within a region of a frame, a higher quality i.e. more processing intensive rendering technique may be used, as any rendering error will be more likely to be noticed by a user.

The technology disclosed herein extends to a data processing system configured to perform the steps of the methods of any of the aspects and embodiments disclosed herein.

Thus, in accordance with a further aspect there is provided a data processing system comprising:

a data processor operable to render a sequence of frames to produce a sequence of frames for display, each frame representing a view of a scene of one or more objects;

a motion tracking processing circuit configured to track the motion of one or more objects between frames in a sequence of frames being rendered by the data processor;

an amount of motion determining processing circuit configured to determine, when a new frame in a sequence of frames is to be rendered, and based on the tracked motion of one or more objects between frames in the sequence of frames, an amount of motion between frames within each one of a set of one or more regions of the new frame;

a rendering technique selecting processing circuit configured to select a rendering technique for rendering a region of a new frame from among a plurality of available rendering techniques based upon a determined amount of motion within the region between frames;

and a control processing circuit configured to control the data processor to render the region of the new frame using the selected rendering technique.

The technology in accordance with this further aspect may include any of the features described in relation to the method aspects and vice versa. Thus, the methods disclosed herein may include any of the steps that any of the processing circuit/circuitry of the system is described as being configured to perform, while any of the processing circuit/circuitry of the system may be configured to perform any of the steps described in relation to the methods.

The data processing system is, optionally, associated and/or is in communication with and/or includes a display, and the data processing system is optionally arranged to produce a sequence of frames for display, i.e. by the display. The data processing system (e.g. the display processor) may be arranged to provide the sequence of frames produced to the display. The methods described herein may further comprise providing the sequence of frames produced to a display of the data processing system. It will be appreciated that the sequence of frames may be transmitted in any suitable manner to the display, whether using wired or wireless techniques. For example, the frames may be compressed and transmitted wirelessly for display by a remote panel. In other embodiments the frames may be compressed and sent over a network, for example, and displayed remotely, e.g. for video conferencing applications.

In accordance with the technology described herein in any of its aspects, the steps of determining an amount of motion within a region between frames, selecting a rendering technique for rendering the region, and rendering the region, are performed in relation to a set of one or more regions of the new frame. A region of the new frame may be the entire frame, or only a portion of the frame. For example, it is envisaged that the region might correspond to the entire frame, with the rendering technique for the entire frame being selected based upon an amount of motion within the frame determined in respect of the frame as a whole. In these embodiments, the method is performed in relation to a single region corresponding to the entire frame. However, in embodiments, a plurality of regions are considered independently and separately for the frame. In embodiments, for at least some of the frames in the sequence of frames, the method is performed in relation to a region of the new frame which is only a portion of the frame.

Where a set of a plurality of regions of a new frame are considered, the regions may be chosen in any suitable manner. For example, the number of regions within a frame that are considered, (and/or the size of the regions), may depend upon a number of factors, and may be set dynamically. The size and/or number of regions may be based on e.g. the degree to which motion in different parts of the frame differs, or the processing power available etc. In some embodiments, the extent of the regions depends upon the amounts of motion associated with different parts of the frame. A region may be arranged to include at least the area covered by a given object e.g. polygon associated with a given amount of motion.

Where multiple regions are considered, the regions may be of differing area and/or shape, although in some embodiments are regularly sized and shaped. In other embodiments, the regions may be based upon the position of objects within the frame, and may therefore differ in size and/or shape, depending upon the size and/or shape of different objects in the frame. The regions may be, and are optionally, non-overlapping. The total area of the plurality of regions may correspond to the entire area of the frame i.e. such that each portion of the frame is assigned to a given one of the at least one region.

In one embodiment, a frame (and each frame) is divided into a predefined, regular array of regions, with each of the regions being the same size and shape, and optionally being rectangular and optionally square. In this case, the entire area of the frame is optionally covered by the regular array of regions.

In other embodiments, the regions are defined based on the objects to be rendered. For example, a region may be defined for a (and each) object (e.g. primitive) to be rendered to be used for that object only. In this case, the region may correspond to the area covered by the object, or the area of a bounding box that encompasses the object. In this case the regions considered for different objects may overlap.

In some embodiments, each one of a plurality of regions considered within a new frame corresponds to a set of one or more "tiles" of the frame. The region may correspond to an integral number of the tiles. A "tile" is a sub-unit of a frame which, e.g. a processor, e.g. a graphics processing unit (GPU), of the data processing system produces as its output. Thus, each region may correspond to a set of one or more tiles of a set of processing tiles that the data processing system generates as its output. Although each region may correspond to a set of a plurality of tiles, in embodiments each region corresponds to a single individual tile. Alternatively, a region may correspond to a set of one or more, and optionally a plurality, of blocks of the region used in performing checkerboard rendering. The region may thus correspond to an integral number of the blocks. Such techniques are described in more detail below. In general, a region may correspond to an integral number of some sub-unit of the frame defined for other purposes e.g. in relation to the data processing system, such as a processing tile as envisaged above, or an area defined for the purpose of checkerboard rendering etc.

As mentioned above, the region may be of any shape and size, and, where multiple regions are considered, the multiple regions may or may not be of regular shape and size. The or each sub-unit may be assigned to a region based on whether it includes any part, or at least a minimum amount, of an object associated with a given amount of motion e.g. high, low or intermediate motion. Alternatively or additionally, a sub-unit may be assigned to a region based on an overall amount of motion within the sub-unit. The amount of motion may be based upon an amount of motion of each one of one or more objects within the sub-unit. For example, motion vectors determined in respect of each one of a plurality of objects within the sub-unit may be summed to determine an overall amount of motion for the sub-unit. An object may be considered to be within the sub-unit when at least a part of the object is within the sub-unit.

The amount of motion within a region between frames may be determined in any suitable manner. In an embodiment, the amount of motion within a region of a frame is based on, and optionally corresponds to, an amount of motion of one or more objects within the region of the frame between frames. The amount of motion of the one or more objects in a frame between frames is determined using the frame and one or more other frame e.g. based on the position of the one or more objects in the frame and one or more other frame. The one or more other frame may comprise one or more preceding frame. The one or more preceding frame may be one or more immediately preceding frame.

For a given region, the amount of motion within the region between frames is determined. In embodiments, the amount of motion within the region is based on an amount of motion of one or more objects within the region of the frame between frames. The one or more objects are one or more objects which are considered in relation to the region. The one or more objects may be, and in embodiments are, a subset of the one or more objects which are tracked between frames in the sequence of frames. The one or more objects which are tracked between frames may include one or more objects outside the region. The or each object may be an object of which at least a part, and optionally the entire object, is within the region. The area of the region may be smaller than, the same as, or larger than an area of the object. In embodiments, the area of the region is at least as great as the area of the object, and optionally larger than the area of the object. How closely the area of a region corresponds to the area of an object within the region may depend upon various factors, e.g. whether a region is made up of an integral number of sub-units of the frame, in which case, the region may include all or any sub-unit having more than a given amount of its area covered by the object.

It will be appreciated that the one or more objects considered within the region, (in respect of which the amount of motion is determined), may or may not correspond to all objects within the region. Where a region includes multiple objects, the one or more objects considered may be all objects in the region, or a subset of a plurality of objects in the region.

In some embodiments, the method is performed in respect of a region on an object by object basis, with data for the region being determined on an object by object basis. Thus, the method may comprise, where more than one object is within a region of the new frame, determining, based on the tracked motion of a first object between frames in the sequence of frames, an amount of motion of the first object within the region between frames; selecting a rendering technique for rendering the region of the new frame in respect of the first object from among a plurality of available rendering techniques based upon the determined amount of motion of the first object within the region between frames; and rendering the region of the new frame in respect of the first object using the selected rendering technique; and repeating the determining, selecting and rendering steps for one or more, (or optionally each), further object within the region. In these embodiments, the or each rendering technique for a region is selected based on the amount of motion of a single object within the region. Thus, multiple rendering techniques may be selected in respect of multiple objects for the same region, where different objects within the region are associated with different amounts of motion.

Such embodiments may be particularly applicable to certain rendering methods, in which data is determined object by object, e.g. primitive by primitive, such as when performing immediate mode rendering.

In an immediate mode rendering arrangement, each region may be in respect of a given object within the frame, (with the region then being of an area equal to or greater than that of the object), and the amount of motion of the object, i.e. a single object, is determined, based on the tracked motion of the object between frames, and a rendering technique selected for the object in question based upon the determined amount of motion of the object. This may then be repeated for one or more further region associated with a respective object, where applicable. Where objects overlap, it is envisaged that multiple overlapping regions may be considered. Of course, when implementing immediate mode rendering systems, a region may be smaller than an object e.g. an array of regularly sized and shaped regions may be used. In such embodiments rendering may be performed object by object, with each region including at least a predetermined amount of the object being processed, before proceeding to the next object, and processing each region of the object in the same way.

In other embodiments, where a region includes more than one object, it is envisaged that a rendering technique may be selected based on the motion of a plurality of, or each object, within the region. An overall amount of motion for the region may be determined based on the motion of the plurality of objects, or each object, e.g. by summing motion vectors in respect of the different objects. A rendering technique may then be selected based upon overall amount of motion of objects within the region. It is envisaged that such techniques may be particularly applicable to tile-based rendering systems, but may equally be applicable whether or not a tile-based rendering system is used.

In any of the aspects and embodiments of the technology described herein, the amount of motion of one or more objects considered in a region may be determined based on a set of one or more motion vectors obtained in respect of the or each object in the region. The motion vectors may be determined in any suitable manner. A first pass through the frame may be performed in order to determine the set of one or more motion vectors in respect of the or each object. As mentioned above, modern APIs have the ability to record the identity of individual objects within a frame, which can then be used to track the motion of the objects between frames, and hence derive motion vectors for the objects. The method may comprise providing each object appearing within the sequence of frames with an identifier, and using the identifier to track the motion of the or each object between frames. The or each object as referred to herein may be a primitive, such as a polygon.

In embodiments the method comprises assigning the or each region of the new frame to one of a set of a plurality of motion categories based upon the amount of motion, (e.g. of one or more objects), within the region between frames. The set of a plurality of categories may include categories in respect of differing relative amounts of motion i.e. relative between the categories. The categories may include at least two categories, e.g. a first category in respect of a first amount of motion, and a second category in respect of a second amount of motion. Optionally the categories may include a third category in respect of a third amount of motion. The first and second, and, where applicable, third amounts of motion may be increasingly higher amounts of motion. Each amount of motion may be a range of motion.

The first category may be in respect of a low amount of motion, the second category in respect of an intermediate amount of motion, and the third category in respect of a high amount of motion. The terms low, intermediate and high refer to the amounts of motion with which the categories are associated, relative to one another i.e. the second category is associated with a higher amount e.g. range of motion than the first, and the third is associated with a higher amount e.g. range of motion than the second. The low, intermediate and high amount of motion categories may be associated, respectively, with low, intermediate and high ranges of motion. The ranges of motion with which the categories are associated may be selected as desired, and may be set dynamically. Thus, what is defined a high amount of motion in respect of one sequence of frames, or even one frame within a sequence, may be defined differently for a different sequence of frames, or frame within a sequence e.g. depending upon the amount of motion taking place in the frame or sequence as a whole. For example, where the general level of motion is high or low in a particular frame or sequence of frames, it is envisaged that thresholds defining the categories may be adjusted accordingly to ensure that different rendering techniques may be applied efficiently over a frame.

Assigning a region to one of the motion categories may be performed in any suitable manner based on the amount of motion determined in respect of the region, (e.g. in respect of one or more objects considered within the region), between frames. For example, an overall amount of motion may be determined for the region based upon a set of one or more motion vectors obtained in respect of one or more objects considered in the region, such as by summing the absolute magnitudes of all the motion vectors for the one or more objects considered in the region. The overall amount of motion may then be compared to an amount e.g. range of motion associated with one or more, or each category to determine the category to which the region should be assigned. This may involve comparing the overall amount of motion to one or more predetermined values and/or ranges defining the amount of motion associated with the category. The one or more predetermined values may include one or more threshold values. Multiple threshold values may define a range. More than one region may be assigned to each category in respect of a frame. For example, there may be multiple regions having high or intermediate amounts of motion in the form of islands within a region corresponding to a "sea" of no motion. The low, intermediate and high amount of motion categories may be defined as desired, and may be defined dynamically e.g. based upon the motion of objects within frames in the sequence. The categories may be of the same or differing sizes. The size of a category corresponds to the range of motion covered by the category, defined within the boundaries of the category. For example, the boundaries between the categories may be set as appropriate to achieve a desired balance between perceived output frame quality and processing effort/resource required. For example, where a higher quality of rendering is applied to regions assigned to the intermediate amount of motion category, the range of motion defined by the category, and hence the number of regions assigned thereto, will have an impact on the overall level of processing power required and the perceived output frame quality, with the processing power increasing and the frame quality increasing as the boundaries of the category are moved so as to increase the range of motion covered by the category.

While in embodiments, three categories are used, it will be appreciated that a greater or lesser number of categories may be used. In some embodiments, only three categories are used. The low, intermediate and high amount of motion categories may then cover all possible amount of motion of a region. The low amount of motion category may include no motion, such that a region within which there is no motion between frames, whether due to the absence of any object, or where any object considered in relation to the region does not move between frames, would be assigned to the low motion category. In other embodiments, the plurality of categories includes a category in respect of no motion within the region. This may be used where the region does not include any object, such that no motion is associated with the region, or where any object considered within the region is associated with no motion between frames. In embodiments, the categories include four categories, including first, second and third categories as described previously, and a fourth category in respect of no motion.

In accordance with the technology disclosed herein, a rendering technique for a region is selected based upon an amount of motion within the region between frames (e.g. of one or more objects considered within the region). The method may comprise selecting a rendering technique of a given quality from among a plurality of rendering techniques of different quality available to the data processor for a region based on the amount of motion within the region between frames. In embodiments in which the or each region is assigned to one of a set of a plurality of motion categories based on the amount of motion (e.g. of the one or more objects) within the region, the method may comprise selecting the rendering technique for the region based on the amount of motion category to which the region is assigned. In embodiments in which at least low, intermediate and high amount of motion categories are used, the rendering technique used in respect of the intermediate amount of motion category may be different to the rendering technique or techniques used in respect of both the low and high amount of motion categories. The rendering technique in respect of the intermediate amount of motion category is different to the rendering technique associated with the low amount of motion category and is also different to the rendering technique associated with the high amount of motion category. The rendering technique used in respect of the low and high amount of motion categories may be the same or different to one another. In some embodiments, the rendering technique used in respect of the low amount of motion category is of higher quality than that used in respect of the high amount of motion category. The rendering technique used in respect of the intermediate amount of motion category may be a higher quality rendering technique than the rendering technique or techniques associated with either or both of the low and high amount of motion categories. The rendering technique used in respect of the intermediate amount of motion category may be a highest quality rendering technique available.

It will be appreciated that the quality of a rendering technique selected for a particular category will depend upon the quality of rendering technique selected for another one of the categories e.g. at least between the intermediate and the low/high amount of motion categories. What is important is the relative quality of the rendering techniques used e.g. between the intermediate amount of motion category and one or both of the high and low amount of motion categories. Where a category is provided in respect of no motion, the quality of rendering technique may be similar, or even lower quality, than that used for a low amount of motion category, as a lower quality technique may be tolerated. In general, different quality rendering techniques applied to different regions differ from each other in respect of a proportion of data elements (e.g. pixels) in the region of the new frame for which data is newly generated, (i.e. rather than being re-used, or otherwise derived based on previously generated data).

Different rendering techniques as referred to herein may be different types of rendering technique e.g. which work on different principles, such as full resolution rendering, upscaling, re-using previously generated data, or so-called "checkerboard" rendering. Alternatively, different rendering techniques may instead involve performing a particular type of rendering technique in a different manner e.g. based on different parameters, such as checkerboard rendering performed at different rates, and/or to different resolutions. A rendering technique as referred to herein may involve any steps required to render a region of the new frame. The technique may involve newly generating data for at least some the region of the new frame, and/or deriving data for at least some of the region of the new frame based on previously generated data, whether generated in respect of the same frame, or a preceding frame or frames.

A selected rendering technique may be selected from any one of the following rendering techniques, depending upon which rendering techniques are available to the data processing system.

The rendering technique may be a full resolution rendering technique in which data is newly generated to render the region to a resolution to match a resolution required for display, (i.e. output). In full resolution rendering, data is newly generated in respect of each data element e.g. pixel in the region. Such a technique would, where available, constitute the highest quality available rendering technique for the data processing system. This technique may be selected for regions associated with intermediate amounts of movement, where higher quality rendering is justified, as any rendering errors will be more apparent to the user. It will be appreciated that full resolution rendering may not be applied to the entirety of each frame of the sequence, and typically would only be applied to a region which corresponds to only a portion of a frame. If full resolution rendering is not available, the highest quality rendering available may be checkerboard rendering e.g. standard checkerboard rendering, as discussed below.

The rendering technique may be an upscaling rendering technique in which data is newly generated in respect of the region of the frame to provide a version of the region of the frame at a lower resolution than that required for display, with additional data then being derived based on the newly generated data to increase the resolution of the region of the frame to the resolution required for output. In such embodiments, data is newly generated in relation to a subset of the data elements (e.g. pixels) of the region of the frame, with the additional data being derived in respect of a remainder of the data elements (e.g. pixels). The additional data may be derived using an interpolation technique based on the newly generated data. For example, data for a data element e.g. pixel in the region of the frame for which new data was not newly generated may be determined using data in respect of one or more neighbouring data elements e.g. pixels, such as from four nearest neighbouring pixels. An upscaling technique may, where available, constitute a lowest quality available rendering technique for the data processing system. Such a technique may be applicable to regions associated with a low or high amount of motion, as any rendering errors are less perceptible in such regions. If upscaling is not available, a lowest quality rendering technique might be a relatively low quality checkerboard rendering technique e.g. performed at a lower rate.

The rendering technique may be a checkerboard rendering technique in which, for a region of a frame, data is newly generated in respect of only a portion of the region of the frame, with data being derived in respect of a remainder of the region of the frame based on data previously generated in respect of the remainder of the region of the frame. The previously generated data may be data that was (newly) generated in relation to the remainder of the region in one or more immediately preceding frames e.g. in relation to the rendering of the remainder of the region in the one or more immediately preceding frames. Whether the previously generated data relates to a single, or multiple immediately preceding frames, will depend upon whether data was newly generated in relation to the entire remainder of the region of the frame in a single immediately preceding frame, or whether the data was newly generated in relation to only a portion of the remainder of the region at a time, with each portion being newly generated in respect of a given one of a plurality of the immediately preceding frames. Thus, in checkerboard rendering, for any given frame, data is newly generated in respect of only a portion of a region of the frame, with data for the remainder of the region being determined based on data previously generated in relation to the region in one or more immediately preceding frames.

The portion of the region in respect of which data is newly generated for the frame may correspond to a (first) subset of a set of a plurality of blocks within the region. The (first) subset of blocks may be any subset of the blocks. Each one of the plurality of blocks within the region may be of any configuration i.e. shape and/or size, although in embodiments the blocks are of regular shape and size. For example, in some embodiments each block is a 2×2 pixel block. The blocks may define a regular array. In embodiments the plurality of blocks are squares or rectangles. The blocks may cover the entire area of the region.

In embodiments the subset may be one of N subsets within the set of blocks, each subset comprising a plurality of the blocks, wherein the subset of blocks in relation to which data is newly generated for a region of a given frame is (only) one of the subsets of blocks. Thus, the first subset of blocks mentioned above is, in such embodiments, one of the N subsets of blocks. The method may comprise, for a given region of a frame, generating new data in relation to only one of the N subsets of blocks, and determining data in respect of each one of the other subsets of blocks based on data generated previously in respect of the given subset of blocks. The previously generated data in respect of a given subset of blocks is data which was (newly) generated in one of the N−1 immediately preceding frames. In any given frame, data is only newly generated in relation to a subset of the blocks (in a region of the frame). Thus, in a simple example, where the blocks are divided into two subsets, new data is generated in relation to 50% of the blocks in respect of a region of a given frame. The data for the other subset of blocks in the region of the frame is based on data which was (newly) generated in relation to the immediately preceding frame. Where the blocks are divided into three subsets, the data for each one of the subsets of blocks which is not newly generated in relation to a region of a given frame is determined based on the applicable one of the preceding two frames, in relation to which the data was newly generated for the subset of blocks.

The number of blocks in each subset may be equal. The blocks may be of equal size and shape. In embodiments, the N subsets are equal subsets, i.e. the number of blocks in each subset is equal. In embodiments the total area of the region covered by the blocks in each subset is equal. Where the blocks define a regular array e.g. a plurality of rows and columns, the blocks may be assigned to the subsets such that every Nth alternate block (e.g. along any column or row of the array) is allocated to a different one of the N subsets. Alternatively, a non-linear pattern may be used to assign blocks to subsets. For example, where N is an even number, blocks from the set of blocks within the region of the frame may be considered in groups, each forming an N/2×N/2 array, with one block from each group being assigned to each particular subset. In this way, the perceived effect of only generating new data in respect of a particular block every N frames may be reduced, as new data will be generated in respect of a neighbouring, or near neighbouring block. In a simple case, in which N=2, this will result in the subsets of blocks defining a checkerboard pattern i.e. with the subsets of blocks corresponding to the white and black blocks of the checkerboard. However, the subsets of blocks are determined, in embodiments in which the total area of the region covered by the blocks in each subset is equal, for each frame, new data will be generated in relation to 1/N of the area of the region.

Checkerboard rendering techniques may be used to provide rendering at different levels of quality depending upon the parameters used in the technique. It will be appreciated that the parameter "N" will define a "rate" of the checkerboard rendering i.e. after how many consecutive frames all data in the region will have been (newly) generated. Thus, the larger the value of N, the lower the rate of rendering. Reducing the rate of checkerboard rendering will reduce the graphics processing load, but will result in a relatively lower quality rendered output frame, and vice versa. Thus, in embodiments, different rendering techniques may be checkerboard rendering techniques performed at different rates. The available rendering techniques may include checkerboard rendering techniques performed at different rates, for example where N has any value in the range of 2-4. Standard checkerboard rendering may be defined as checkerboard rendering performed with N=2. In such techniques new data is generated in respect of the "black" and "white" blocks of the checkerboard pattern in alternate successive frames. Higher values of N may provide relatively lower quality, i.e. (lower rate), checkerboard rendering.

Alternatively or additionally, checkerboard rendering may be performed to differing levels of resolution. For example, the data which is newly generated may be generated at different levels of resolution i.e. such that data is generated in respect of differing proportions of data elements e.g. pixels within those blocks for which data is newly generated within the region. In one embodiment, checkerboard rendering may be performed at half resolution, with data being newly generated in respect of half of the data elements e.g. pixels in each block. Data may be derived for other data elements e.g. pixels within the blocks by interpolation from those in respect of which it is newly generated (e.g. by upscaling), or based on previously generated data for the pixels, and so on.

The data for a subset of blocks which is not newly generated in relation to a region of a given frame, and which is determined in the checkerboard rendering process, may be determined based on the data in relation to one or more immediately preceding frames in any suitable manner. In some embodiments the checkerboard rendering process is arranged to determine the data using data indicative of the motion of objects between frames obtained by the tracking of the motion of the one or more objects between frames. The data for the subset of blocks which is not newly generated may be determined based on data indicative of the motion of objects between frames in an applicable area or areas e.g. each area corresponding to the checkerboard block etc. Embodiments in which one of the available rendering techniques is a checkerboard rendering technique are therefore particularly advantageous, as data relating to the movement of objects between frames which is obtained for the purposes of performing checkerboard rendering may be utilised for the new and additional purpose of selecting a rendering technique for use in respect of a region of a frame. In other words, the technology disclosed herein may exploit already existing data for a new purpose to provide an improved rendering process.

The rendering technique may be a rendering technique in which data is derived for the entire region of a frame based on data previously generated in respect of the region i.e. in relation to a preceding frame. This is in contrast to checkerboard rendering, in which some of the data for a region is newly generated for a given frame. A rendering technique in which data for the entire region of a frame is based on previously generated data may constitute a lowest quality rendering technique, and might be applicable to a region where there is no motion of one or more objects being considered, or where the region does not include an object. Such a rendering technique may be applied to a no motion category, where used.

It will be appreciated that any ones of the above rendering techniques may be available, and used depending upon the amount of motion determined for a region. The exemplified techniques are by way of example only, and are not exhaustive. Other techniques may be used.

Various factors may be taken into account when determining the rendering techniques to be used for each category, and the selection may be changed dynamically. One example of such a factor is the frame rate. If the frame rate is low, for example less than 30 fps, the lowest quality rendering technique may be set relatively high e.g. to standard CBR, while if the frame rate is higher, it may be assumed that lower quality CBR or upscaling would be sufficient as the lowest quality rendering technique (as any rendering errors would be less apparent at the higher frame rates).

In some exemplary embodiments to illustrate the way in which different rendering techniques may be selected, the method may comprise, where a checkerboard rendering technique is available, selecting the checkerboard rendering technique for rendering regions assigned to the low and/or high amount of motion categories. The method may also comprise selecting the checkerboard rendering technique for rendering data for regions assigned to the intermediate amount of motion category (in embodiments using low, high and intermediate categories of motion). Where the checkerboard rendering technique is used in rendering a region assigned to the intermediate amount of motion category, a higher quality checkerboard rendering process may be used than when checkerboard rendering is used in rendering a regions assigned to the low and/or high amount of motion categories. The higher quality checkerboard rendering process may be a checkerboard rendering process performed at a lower rate and/or a higher resolution than the lower quality checkerboard rendering process. For example, for the low and/or high amount of motion regions, the checkerboard rendering technique may be performed at a rate with $N \geq 2$ for such categories, and/or may be performed at half resolution. For intermediate amount of motion regions the checkerboard rendering technique may be performed at a rate with $N=2$, and/or may be performed at full resolution.

In another example, standard checkerboard rendering may be used for low amount of motion regions, while a lower quality, e.g. lower resolution and/or lower rate, checkerboard rendering technique may be used for high amount of motion regions. A full resolution rendering technique may be used for intermediate amount of motion regions.

For regions assigned to a no motion category i.e. having no motion of one or more objects considered therein, or having no objects therein, data may be derived from previously generated data for the region (e.g. that was generated for a previous frame). For example, the previously generated data may simply be reused.

Data that is derived for any data elements e.g. pixels and/or portions within a region for which data is not newly generated may be derived at any time. This may be performed at a later stage, once all the data that is to be newly generated e.g. in respect of all regions or objects etc. has been generated, or may be performed in respect of a particular region or portions thereof closer to the time that any new data is generated e.g. in respect of a particular region or object etc.

It will be appreciated from the above, that depending upon the rendering technique used, data for a region of a new frame may be entirely or only partially newly generated for the new frame, with, in the latter case, other data for the region for the new frame then being derived from other data (whether newly generated for the same frame or a different frame). In the case where data that is not newly generated for a frame region is being derived from other data, that derivation process can be performed by any suitable and desired process and element of the data processing system. Thus it could be performed by a different processor to the processor that is newly generating data for the region of the frame, but in an embodiment the same processor that newly generates the data for a region also derives any "missing" data for the region. Thus, in an embodiment, a graphics processor that is generating the sequence of frames will both newly generate data for a region of the frame and derive any "missing" data for that region of the frame (so as to provide as its output a "complete" frame region).

A region of the new frame is rendered using the selected rendering technique. It will be appreciated that, in some embodiments, rendering in respect of a region may be performed in respect of multiple objects, with rendering occurring on an object by object basis. Thus multiple sets of data may be determined in respect of a region for rendering different objects. Such multiple sets of data may be combined in any suitable manner e.g. taking into account the visibility of different objects etc.

It will be appreciated that factors other than the motion within a region between frames may be used in selecting a rendering technique for use in rendering a region.

One such factor is foveation. The way in which multiple factors are balanced in determining the selection of a technique may be set as desired. It is envisaged that, in some circumstances, another factor might override the amount of motion in determining the selection of a rendering technique. This may be achieved in various manners. For example, regions in proximity to a fixation point ("foveated regions") may, for example, be biased toward higher quality rendering regardless of an amount of motion associated with the region. Foveated regions correspond to regions which should be rendered at a higher quality for foveation purposes, as described, for example in GB 2553744 (ARM Limited), the entire contents of which is herein incorporated by reference. Alternatively or additionally, the boundaries of a category in respect of an intermediate amount of movement might be adjusted to cause the amounts of motion associated with foveated regions to be sufficient for those regions to be more likely to be included in the intermediate amount of motion category. In contrast, regions away from the fixation point may be biased towards being more likely to be rendered using a lower quality rendering technique. In these regions, lower quality rendering is more acceptable from a foveation perspective at least. Thus, this may simply override an amount of motion associated with such regions when selecting a rendering technique, or the boundaries of the intermediate amount of motion category may be adjusted to cause those regions not to fall within the intermediate amount of motion category, and so on.

Another factor which may alternatively or additionally be taken into account in selecting a rendering technique for rendering a region is the existence of any change or changes in an object or objects (or at least a portion thereof) appearing within the region between frames. For example, it is envisaged that where an object disappears, appears and/or changes in some manner e.g. changes shape within a region between frames, the region may be assigned to the high amount of motion category, or otherwise may be biased towards rendering of a particular quality, such as that associated with a high amount of motion category. For example, an object may be dented from one frame to the next. The technology disclosed herein has been described in relation to the steps which are performed when a new frame in a sequence of frames is to be rendered. Once the new frame has been rendered, the methods described herein may be repeated for the next frame in the sequence of frames, with the next frame in the sequence of frames becoming the next new frame to be rendered, and so on, until each frame in the sequence of frames has been rendered.

The methods described herein are used to produce a sequence of frames for display. The sequence of frames should be produced at an overall resolution and rate that is required i.e. by a display. It will be appreciated that there may be some variation in the resolution of frames produced and/or the rate at which the frames are produced within the sequence, and that some frames may be processed more or less intensively than others within the sequence. It is envisaged that the rendering technique or techniques selected in relation to the one or more regions of a new frame may take into account the rendering technique or techniques selected for a preceding frame or frames. This may help to ensure that the overall processing effort required to render the sequence of frames at the required resolution and rate is consistent with the processing effort available in the system. For example, where a higher quality rendering technique is selected for a relatively large portion of a given frame e.g. full resolution rendering, the selection of rendering technique(s) for a subsequent frame or frames may be biased toward lower quality rendering technique(s). It will be seen that the techniques described herein facilitate providing a sequence of frames at a resolution and rate required for output i.e. display even where the data processor is unable to render the entirety of each frame in the sequence to the required resolution while still maintaining the required output rate. Frames may be generated of a visually similar quality to conventionally rendered frames, but in a manner which requires less computation and power consumption.

The technology described herein is in an embodiment implemented in and as part of an overall data processing system that includes one or more of: a host processor (central processing unit (CPU)), a graphics processor (processing unit), a display processor, a video processor (codec), a system bus, and a memory controller.

The processing circuitry and circuits of the technology described herein may, e.g., form part of the graphics processor (processing unit), the display processor and/or another suitable component of the data processing system, e.g. as described above, or may otherwise be provided in the data processing system. It may comprise programmable and/or fixed function processing circuits/circuitry, and/or may comprise dedicated processing circuits/circuitry and/or processing circuits/circuitry used for other processing as well, as desired.

The host processor may execute applications that can require graphics processing by the graphics processor, and send appropriate commands and data to the graphics processor to control it to perform graphics processing operations and to produce graphics processing (render) output required by applications executing on the host processor (including in the manner of the technology described herein).

Similarly, there is in an embodiment an application on the host processor that indicates a requirement for performing processing operations in the manner of the technology described herein, which requirement is then recognised by, e.g., the driver executing on, the host processor, with the, e.g. driver on, the host processor then operating to instruct the graphics processor to render data accordingly.

Similarly, the data processing system in an embodiment has or is in communication with a memory in which frames generated, e.g. by the graphics processor, may be stored, e.g. for subsequent processing, e.g. display (e.g. via the memory controller). Thus, in an embodiment, the data processing system comprises, and/or is in communication with, one or more memories and/or memory devices that store the data described herein, and/or that store software for performing the processes described herein.

The graphics processor can include, and in an embodiment does include, any one or more, and in an embodiment all, of the processing stages that a graphics processor (processing unit) can normally include. Thus, for example, the graphics processor in an embodiment includes a primitive setup stage, a rasteriser and a renderer. In an embodiment the renderer is in the form of or includes a programmable fragment shader.

The graphics processor is in an embodiment a tile-based graphics processor comprising a tile buffer for storing tile sample values and/or a write out unit that operates to write the data in the tile buffer (e.g. once the data in the tile buffer is complete) out to external (main) memory (e.g. to a frame buffer).

It will be appreciated by those skilled in the art that all of the described aspects and embodiments of the technology described herein can, and in an embodiment do, include, as appropriate, any one or more or all of the features described herein.

The technology described herein can be implemented in any suitable system, such as a suitably configured micro-processor based system. In an embodiment, the technology described herein is implemented in a computer and/or micro-processor based system.

The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuitry/circuits) and/or programmable hardware elements (processing circuitry/circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the components of the graphics processing system can otherwise include any one or more or all of the usual functional units, etc., that such components include.

It will be appreciated that the data processor which renders the region (of the set of one or more regions of a new frame) in accordance with the technology as described herein, may or may not also perform the other steps of the method e.g. the steps of tracking the motion of one or more objects between frames, and determining, based on the tracked motion of one or more objects between frames in the sequence of frames, an amount of motion within a region. For example, in some embodiments, all of the steps i.e. rendering, tracking and determining may be performed by the same processor, e.g. a processor of a graphics processing unit, while in other embodiments, the rendering step may be performed by a different processor to the tracking and determining steps e.g. with the rendering step being performed by a processor of a graphics processing unit, and the tracking and determining steps by a host processor. In yet further embodiments, more than two processors may be used, or the steps may be divided between two or more processors in some other manner. Similarly, the processing circuit/circuitry for performing the various steps set out in relation to the system may be associated with the same or a different processor or processors of the system to a data processor which is configured to perform rendering.

Thus, in general, the methods described herein may be implemented using a set of one or more processors, and the systems may include a set of one or more processors. For example, where a rendering technique involves a mixture of generating new data in respect of a new frame, and deriving data based on previously generated data (whether in relation to that frame or a preceding frame), generating the new data, and deriving data based on previously generated data may be performed by the same processor i.e. the data processor, or may be performed by different processors. For example, these steps may both be performed by a processor of a graphics processing unit, or the newly generated data may be generated by such a processor, with the derived data being derived by a display processor.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display processor, or microprocessor system comprising a data processor causes in conjunction with said data processor said controller or system to carry out the steps of the methods of the technology described herein. Such a computer software carrier could be a physical storage intermediate such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory intermediate, such as a computer readable intermediate, for example, diskette, CDROM, ROM, RAM, flash memory, or hard disk. It could also comprise a series of computer readable instructions transmittable to a computer system, via a modem or other interface device, over either a tangible intermediate, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable intermediate with accompanying printed or electronic documentation, for example, shrink wrapped software, preloaded with a computer system, for example, on a system ROM or fixed disk, or distributed from a server or electronic bulletin board over a network, for example, the Internet or World Wide Web.

From a further aspect there is provided a non-transitory computer readable storage intermediate storing software code which, when executing on a processor, performs a method of rendering a sequence of frames to produce a sequence of frames for display, each frame representing a view of a scene of one or more objects;

the method comprising:

tracking the motion of one or more objects between frames in the sequence of frames;

and, when a new frame in the sequence of frames is to be rendered;

for a set of one or more regions of the new frame:

determining, based on the tracked motion of one or more objects between frames in the sequence of frames, an amount of motion within the region between frames;

selecting a rendering technique for rendering the region of the new frame from among a plurality of available rendering techniques based upon the determined amount of motion within the region between frames;

and rendering the region of the new frame using the selected rendering technique.

The technology in accordance with this further aspect may incorporate any or all of the features described in relation to the earlier aspects of the technology e.g. any of the method steps described herein.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

Embodiments of the technology described herein will now be described with reference to the Figures.

The methods disclosed herein may be implemented using a data processing system, which may be as shown in FIG. 1, which is described above.

Figure 2A:
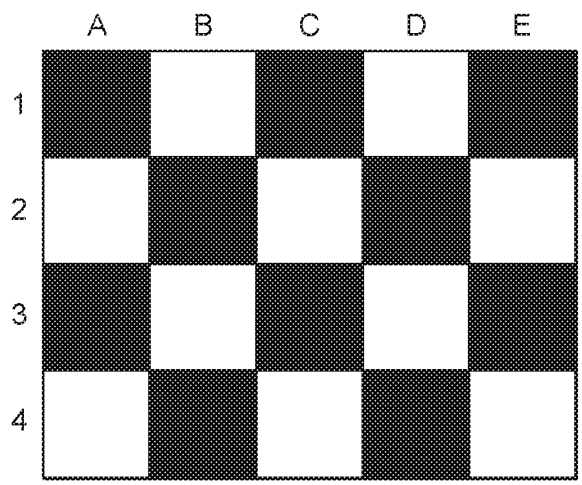
FIGS. 2A and 2B illustrate the way in which a checkerboard rendering technique may be performed, indicating, respectively, the blocks of a frame in respect of which data is newly generated in successive frames.
Figure 2B:
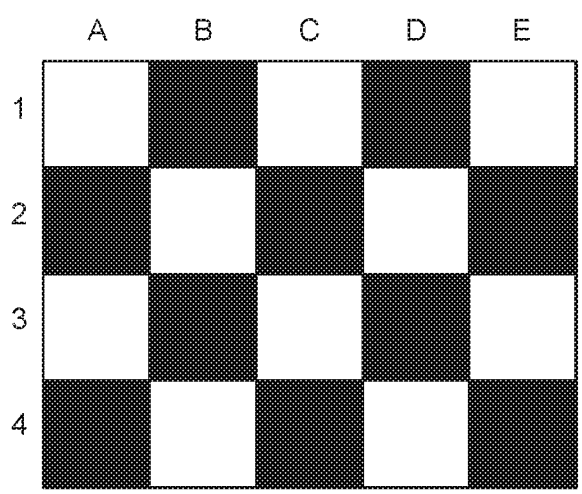

By way of background, FIGS. 2A and 2B illustrate a rendering technique known as "checkerboard rendering". In one example of this rendering technique, for any given frame, data is newly generated in respect of only half of a set of blocks defining a checkerboard pattern within the frame. In the next frame, data is newly generated in respect of the other half of the blocks. Each block may comprise, e.g. 2×2 pixels.

FIGS. 2A and 2B illustrate, for alternate frames, the areas within the frame in respect of which data is newly generated. The areas for which data is newly generated are shown in black. Thus, for first and second successive frames, the areas within the frame for which data is newly generated will be as shown in FIGS. 2A and B respectively. For the next frame, the areas for which data is newly generated will be as shown in FIG. 2A again. For the next frame, the areas for which data is newly generated will be as shown in FIG. 2B, and so on. Accordingly, in alternative frames, data is newly generated in respect of "odd" and "even" blocks. This may reduce the data generating effort required for a given frame by half.

For any given frame, data for those areas of the frame in respect of which data is not newly generated for that frame, is derived based on the data which was newly generated for those areas in the preceding frame. Thus, in FIG. 2B, the data for the white blocks will be derived based on the data for the corresponding blocks which was newly generated in respect of the previous frame shown in FIG. 2A. The data may correspond to the data generated in respect of the previous frame, or may be otherwise based thereon e.g. being interpolated from the previous data. In one example, the data is derived by interpolation based on tracking the movement of objects e.g. primitives between the frames. This may be achieved by recording the identity of individual objects e.g. primitives within a frame, to enable the objects to be tracked as they move between frames. Such functionality is provided by modern APIs, such as Vulcan. Motion vectors may be derived for the objects.

The checkerboard rendering may be performed to different levels of quality. The technique illustrated by reference to FIGS. 2A and B may be considered to be "standard" checkerboard rendering. One example of a lower quality checkerboard rendering technique would operate in a similar manner to that described by reference to FIGS. 2A and 2B, but, rather than newly generating data for half of the blocks in any given frame, data would be newly generated in relation to a smaller fraction of the blocks. For example, data may be generated in relation to one third of the blocks. In such arrangements, data will only be newly generated in respect of a given block every three frames, with data for the block in the intervening frames being obtained based upon the last newly generated data for that block. Such techniques may be considered to provide checkerboard rendering at a lower "rate".

In general, a rate N of a checkerboard rendering technique may be defined, wherein data for a given block is newly generated every N frames, where N>2. For standard checkerboard rendering N=2. For the lower quality checkerboard rendering exemplified above, in which data is newly generated in respect of a given block every 3 frames, N=3. Of course, checkerboard rendering may be performed at yet lower quality, using higher values of N, e.g. N=4 or even N=5.

One example, where N=4, is shown in FIGS. 3A-D. FIGS. 3A-D illustrate the blocks within a frame for which data is newly generated in each one of four successive frames. These blocks are shown in black. Data is newly generated in respect of ¼ of the blocks for each frame. The selected regions illustrate the non-linear pattern used to select blocks for data to be newly generated in a given frame. It has been found that selecting blocks in respect of which data is to be newly generated in any given frame using a non-linear pattern may reduce certain artefacts. For example, rather than generating new data for blocks A1, B1, C1, D1 in successive frames, the blocks may be considered in groups forming a 2×2 grid, with new data being generated in respect of different ones of the blocks within the group in successive frames e.g. A1, B2, B1, A2 etc.

In another example, checkerboard rendering may be performed at lower resolution. For example, for a given block for which data is newly generated in a frame, i.e. a black block, data may be newly generated in respect of only half of the pixels, with data being derived for the other pixels in some manner e.g. based upon data generated in relation to a previous frame, or through interpolation within the frame etc.

The blocks used in checkerboard rendering may be 2×2 pixel blocks, although other size blocks may be contemplated.

The above examples illustrate the way in which checkerboard rendering may be used in a deferred e.g. tile based rendering system. In other rendering systems rendering is performed in immediate mode, in respect of primitives appearing in the frame. In this case, each primitive may then be subjected to checkerboard rendering as it is rendered.

Figure 4:
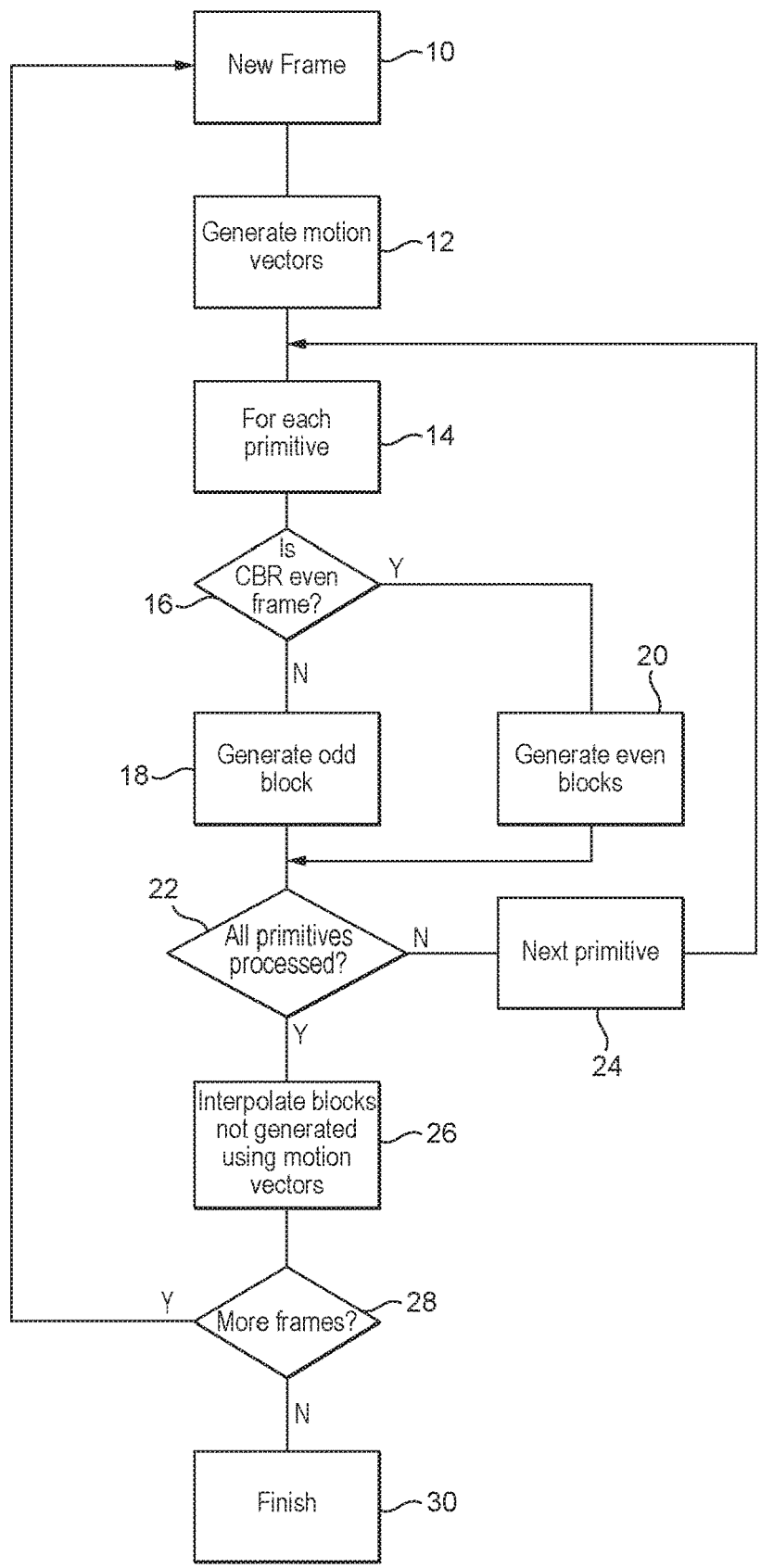
FIG. 4 is a flow chart illustrating one embodiment of a standard checkerboard rendering technique for immediate mode rendering.

FIG. 4 is a flowchart illustrating one example of a standard checkerboard rendering technique. This example shows the process which is performed in respect of immediate mode rendering, in which rendering is performed on primitives in turn, as they are received for processing.

In step 10, the data processing system receives a new frame to be rendered. In step 12 the system generates motion vectors in respect of primitives appearing in the frame. The primitives may be polygons. The motion vectors are generated based on tracking the movement of primitives between frames. The identity of each individual primitive is recorded to enable the primitives to be tracked between frames. The generation of motion vectors for each primitive may be performed by the CPU or GPU.

Each primitive in the frame is considered in turn (step 14). For each primitive, the following steps are performed. In step 16 it is determined whether the frame in question is an odd or even frame for the purposes of checkerboard rendering (CBR) i.e. a frame for which data is to be newly generated in respect of odd blocks or even blocks. Where the frame is not an even frame, the method proceeds to step 18, in which data is newly generated for the odd blocks of a checkerboard pattern within the primitive. Where the frame is an even frame, the method proceeds to step 20, in which data is newly generated in respect of the even blocks of the checkerboard pattern within the primitive.

It is then determined whether all primitives have been processed—step 22. If not, the next primitive is considered (step 24), and steps 16, and, as appropriate, step 18 or step 20, and then step 22 are repeated. Once all primitives have been processed, the method proceeds to step 26, in which data is derived for those blocks for which data was not newly generated in steps 18 and 20 i.e. the even or odd blocks, depending whether the frame was a CBR odd or even frame. The data for the "missing" blocks is derived based on the data newly generated for those blocks in the preceding frame, taking into account the motion vectors generated for the frame i.e. for primitives within the frame. The method then considers whether there are more frames to be rendered (step 28). If so, the method returns to step 10, and repeats the steps in respect of the next frame. This continues until each frame has been rendered, at which time the process ends (step 30).

Figure 5:
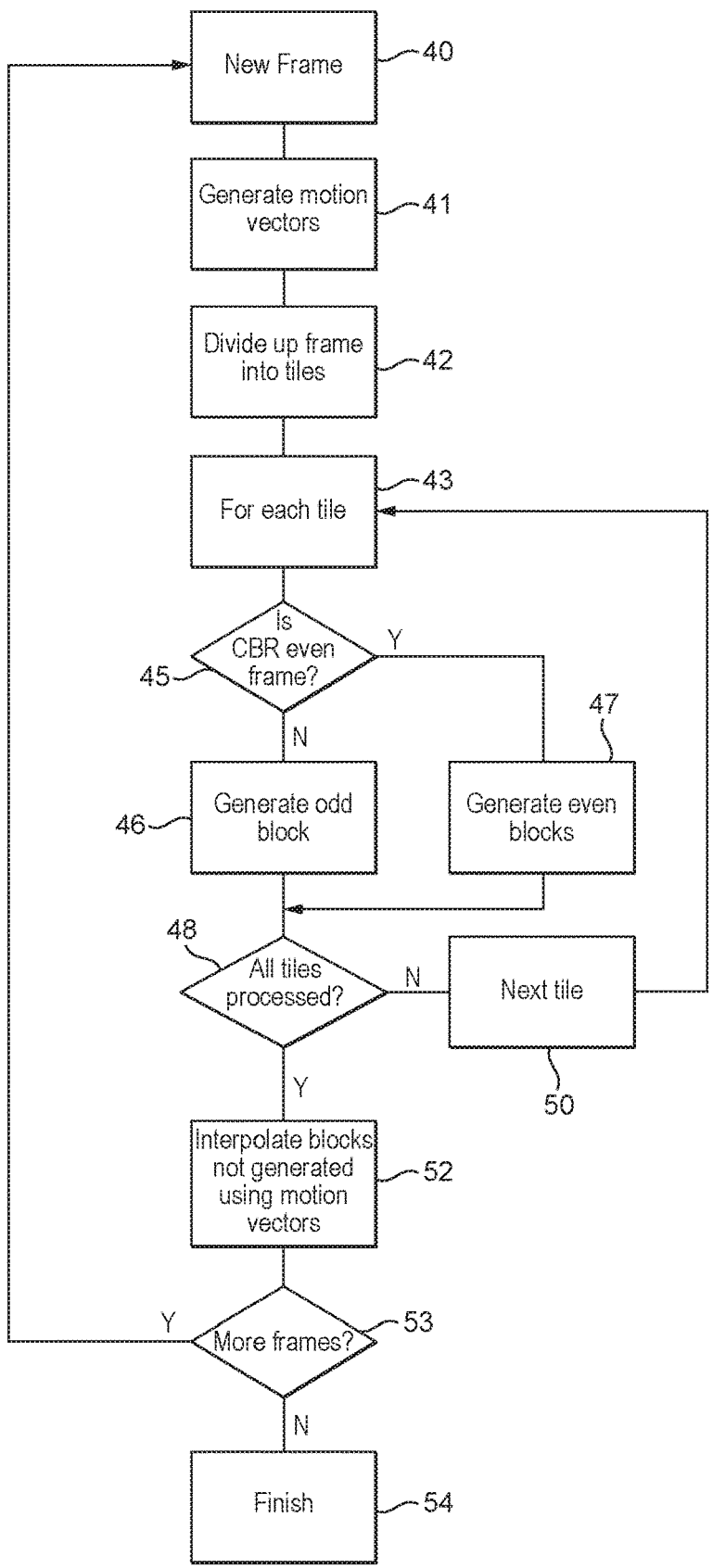
FIG. 5. is a flow chart illustrating one embodiment of a standard checkerboard rendering technique for tile-based rendering.

FIG. 5 is a flowchart illustrating one example of a standard checkerboard rendering technique in respect of deferred, tile-based rendering. For each new frame (step 40), motion vectors are generated (step 41). This may be carried out in the manner described in relation to FIG. 4. The frame is then processed as individual tiles (step 42). The size of the individual tiles may vary, but, in some exemplary embodiments, each tile is a 16×16 pixel area. Each tile is considered in turn (step 43). For each tile, it is determined whether the frame is a CBR even frame (step 45). If not, data is newly generated in respect of the odd blocks of a checkerboard pattern within the tile (step 46). If the frame is an even frame, data is newly generated in respect of the even blocks of a checkerboard pattern within the tile (step 47). It is then determined whether all the tiles have been processed (step 48). If not, the method returns to step 43, and step 45 and then step 46 or 47 as appropriate are performed in respect of the next tile (step 50). This is repeated until all tiles have been processed, at which the method proceeds to step 52, in which data is derived for the blocks in respect of which data was not newly generated in step 46 or 47, as appropriate, taking into account the motion vectors. It is then considered whether there are more frames to be rendered (step 53). If so, the method returns to step 40, and is repeated in respect of the next frame. Once all frames have been rendered, the process ends (step 54).

Some embodiments of the technology described herein will now be illustrated with reference to FIGS. 6 and 7. These embodiments are described in relation to rendering a sequence of frames to produce a sequence of frames for display, each frame representing a view of one or more objects. Each frame for display will be at a resolution required for display (and is produced at a rate required by the display).

Figure 6:
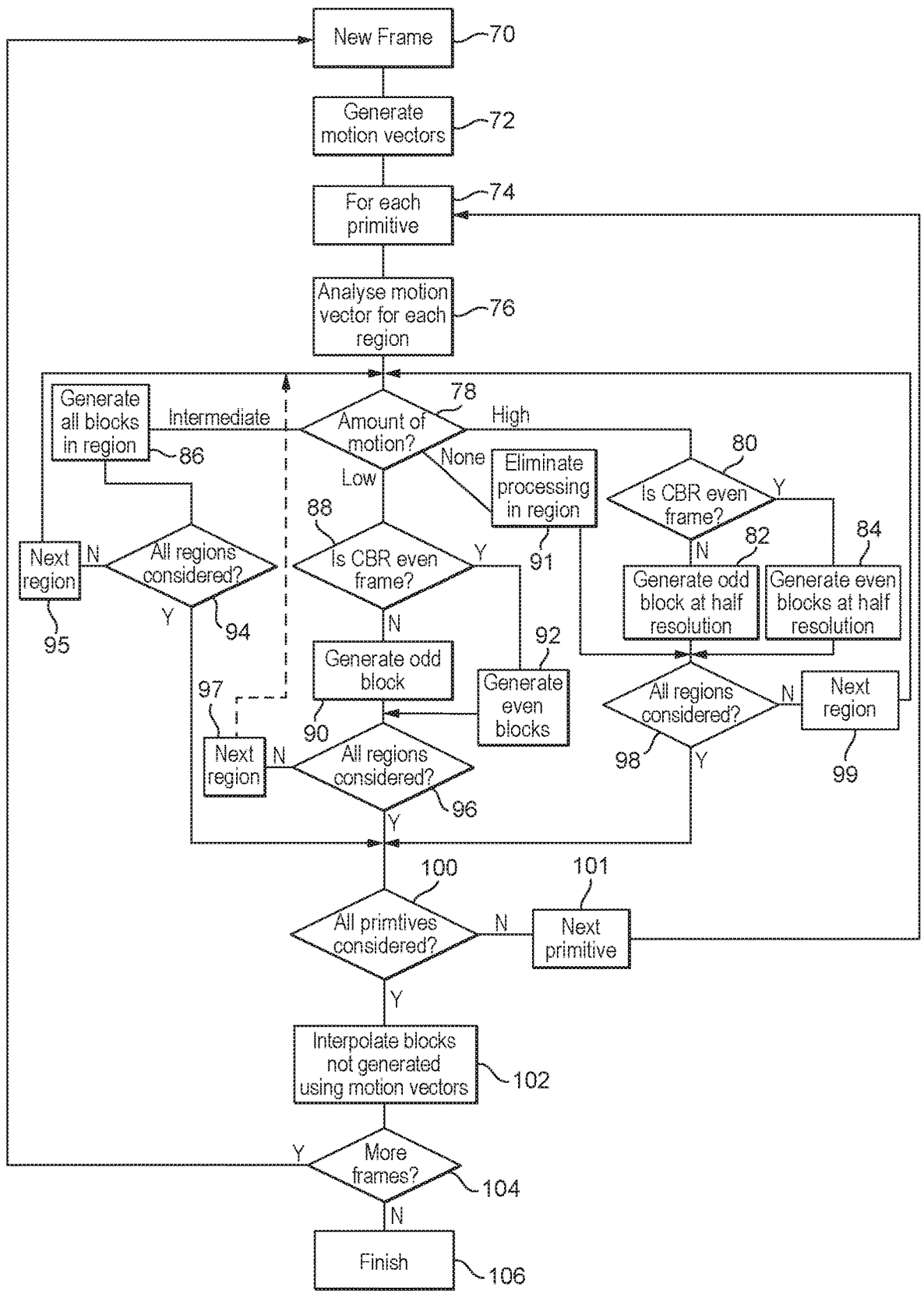
FIG. 6 is a flow chart illustrating one embodiment of the technology disclosed herein as applied to immediate mode rendering.

FIG. 6 illustrates an immediate mode rendering process using the technology described herein. For a new frame to be rendered (step 70), motion vectors are generated (step 72). This may be carried out in the manner described above in relation to FIGS. 4 and 5. The following steps are then performed for each primitive appearing in the frame (step 74).

For each region of a set of one or more regions of the frame, an amount of motion of the primitive being considered within the region is determined (step 76). The regions of the frame considered may be squares defined by a regular grid. The size of the regions may be selected as desired. The amount of motion of the primitive is determined using the motion vectors generated in step 72. The size of motion of the primitive within the region is compared to a set of thresholds to determine whether the region should be assigned to a high amount of motion category, an intermediate amount of motion category, or a low amount of motion category, or whether there is no motion of the primitive in the region. Depending upon the amount of motion of the primitive within the region, different rendering techniques are used.

If a region is found to have a high amount of motion (of the primitive), the method proceeds to step 80, which triggers the generation of data for rendering the primitive in that region using a half resolution checkerboard rendering technique. Thus, it is determined whether the frame is an even frame for the purposes of checkerboard rendering (CBR). This step is the same as in the standard CBR method for immediate mode rendering described in relation to FIG. 4. Where the frame is not an even frame, new data is generated in respect of the odd blocks of a checkerboard pattern within the region—step 82. The data is generated at half resolution. In other words, new data is generated in respect of only 50% of the pixels in the blocks for which data is newly generated. The remaining data for the blocks is derived from the newly generated data using an upscaling technique. Where the frame is a CBR even frame, new data is generated at half resolution for the even blocks of the region—step 84.

If a region is found to have an intermediate amount of motion of the primitive, then full resolution rendering is used, to generate new data for the region at the resolution required by the display. Considering the checkerboard blocks which are used in checkerboard rendering techniques, this involves generating data (at the full resolution) in respect of all blocks in the region, rather than just "odd" or "even" blocks—step 86.

If a region is found to have a low amount of motion of the primitive, then the method proceeds to step 88, and standard CBR is performed for rendering the primitive in the region. Thus, where the frame is an even CBR frame, data is newly generated in respect of the odd blocks (step 90). Where the frame is an odd CBR frame, data is newly generated in respect of the even blocks (step 92).

If it is determined that there is no motion of the primitive in a region, then the method proceeds to step 91, and no processing in the region is performed i.e. no data is newly generated for the region.

After the appropriate rendering technique has been applied (or no action taken in the case of no motion), it is considered whether all regions have yet been considered for the primitive in question (steps 94, 96, 98 as appropriate). If any region has yet to be considered, the method returns to step 78, and the amount of motion in the next region to be considered is determined (steps 95, 97, 99).

Once all regions have been considered, the method proceeds to step 100, where it is considered whether all primitives have been processed. If any primitive remains to be considered (step 101), the method returns to step 74, and is repeated in respect of another primitive. Thus, the amount of motion in each region is analysed in relation to the new primitive. These immediate mode techniques thus consider the amount of motion in each region on a primitive by primitive basis.

Once all regions have been considered in relation to each primitive in the frame, the method proceeds to step 102, and data is interpolated for any blocks for which such data was not newly generated based on previously generated data for the regions, taking into account motion vectors.

In step 104 it is considered whether any more frames need to be rendered. If so, the method returns to step 70. If not, the method finishes (step 106).

In these embodiments, each region of the frame may be of equal size, as mentioned above. For example, each region may correspond to a predetermined number of blocks used in checkerboard rendering e.g. a 4×4 set of blocks. However, this need not be the case, and, in other embodiments, each region may be chosen to correspond to the area of a respective primitive, or a bounding box around the primitive.

Figure 7:
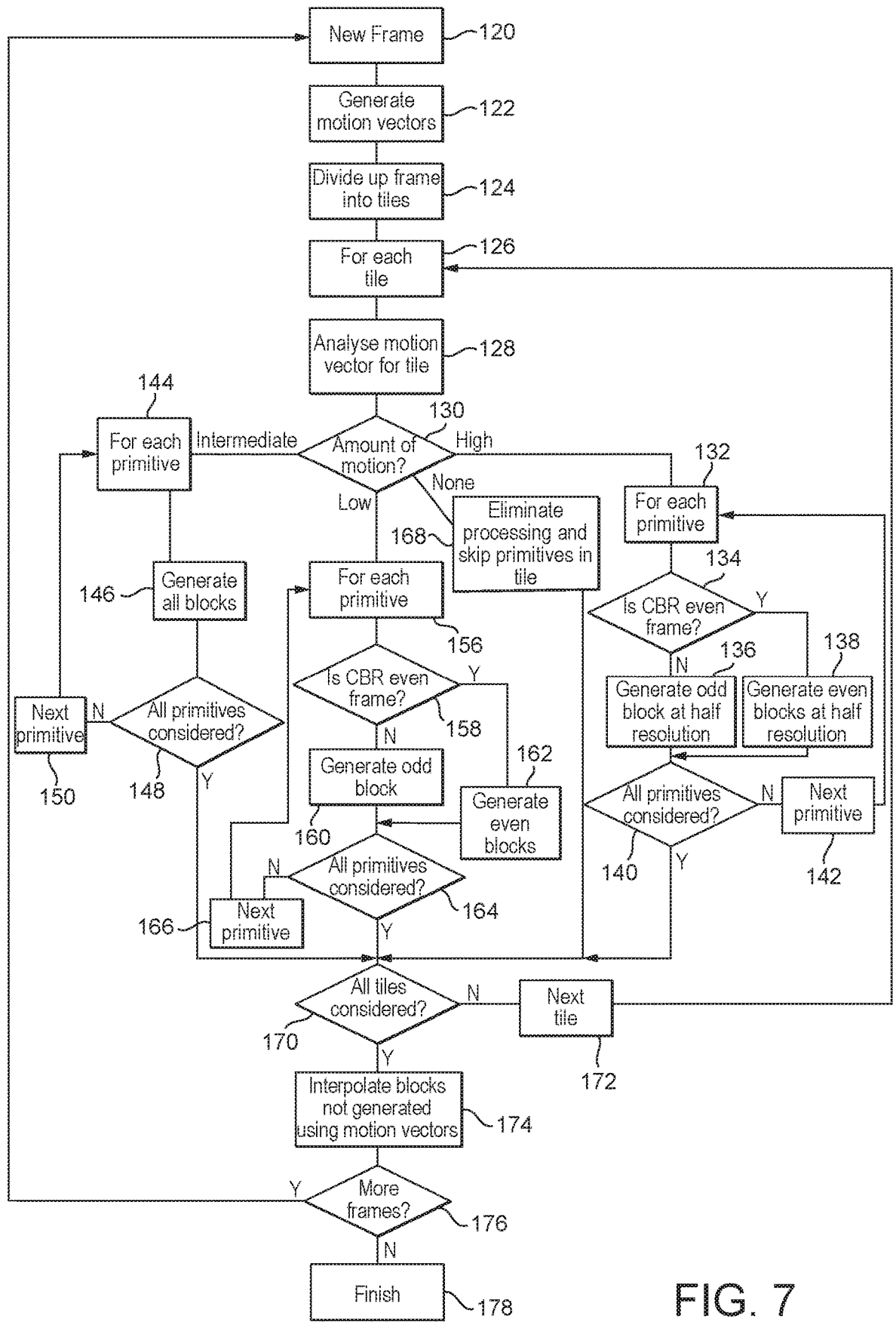
FIG. 7 is a flow chart illustrating one embodiment of the technology disclosed herein, as applied to tile-based rendering.

FIG. 7 illustrates the technology described herein as applied to a tile based rendering system.

For a new frame to be considered (step 120), motion vectors are generated indicative of the motion of primitives within the frame (step 122). The frame is then processed as individual tiles (step 124). The tiles may be of any suitable size, for example 16×16 pixels. The tiles provide the regions of the frame which are considered in relation to these embodiments. Each tile is then considered (step 126). In this tile based rendering system, each primitive to be processed for the tile is rendered in turn for the tile by performing the following steps.

For a given tile, the motion vectors for the tile are analysed (step 128). In step 130, the amount of motion of primitives within the tile is compared to a set of thresholds. It will be appreciated that, in contrast to the immediate mode rendering system described with reference to FIG. 5, in which the motion of one primitive at a time is considered, in the tile based rendering system, the motion vectors in respect of all primitives considered to be included, (at least in part), in the tile are taken into account when determining the amount of motion associated with the tile.

Where the amount of motion within the tile is high, the method proceeds to step 132, in which each primitive within the tile is considered in turn, and half resolution CBR is performed. To do this, it is determined whether the frame is a CBR even frame (step 134). If not, data is newly generated in relation to the odd blocks at half resolution as described in relation to the corresponding step in FIG. 5—step 136. If the frame is not a CBR even frame, the method proceeds to step 138, and data is newly generated in respect of the even blocks at half resolution.

In step 140 it is determined whether all primitives within the tile have been processed. If not, the next primitive is considered (step 142), and the method returns to step 132.

If the tile is found to have a intermediate amount of motion in step 130, the method proceeds to step 144, and full resolution rendering is performed in relation to each primitive within the tile. For a given primitive within the tile, data is generated in relation to all blocks within the tile (that the primitive covers) (step 146). Thus, full resolution rendering is performed. In step 148 it is determined whether all primitives have been considered. If not, the method considers the next primitive in step 150, and returns to step 144.

If the tile is found to have a low amount of motion in step 130, the method proceeds to step 156 and "normal" resolution checkerboard rendering is performed for the tile. For each primitive (step 156), it is determined whether the frame is a CBR even frame (step 158). If not, data is newly generated in relation to the odd blocks (step 160). If so, data is newly generated in relation to the even blocks (step 162). The method then proceeds to step 164, and it is determined whether all primitives have been considered. If not, the next primitive is considered (step 166), and the method returns to step 156.

If it is determined that there is no motion of primitives within the tile in step 130, the method proceeds to step 168, and no data is newly generated in relation to the tile.

Following the rendering technique applied for low, intermediate, or high amounts of motion within the tile as appropriate, (or a determination of no motion), the method proceeds to step 170 once all the necessary primitives have been considered for the tile. Here it is determined whether any tiles remain to be considered, and if so, the next tile is considered (step 172). The method then returns to step 126.

If all tiles have been considered, the method proceeds to step 174, and data is interpolated for those blocks for which data was not newly generated in the preceding rendering process. This is based on data previously generated for the blocks, and takes into account motion vectors within the frame.

In step 176 it is determined whether there are more frames to process. If so, the method returns to 120. If not, the method finishes (step 178).

While the above method has been described in relation to embodiments in which each region considered is a tile, it will be appreciated that the regions need not correspond to the size of a tile in a tile based rendering technique, and may be larger or smaller than a tile e.g. being an integral number of tiles. Any algorithm may be used to determine whether a primitive falls within a tile for the purposes of determining an amount of motion for the tile.

The parameters used to categorise the amount of motion associated with a region may be set as desired, and may be static or dynamic.

It will be seen that in both immediate mode and tiled based implementations of the technology described herein, the rendering technique applied in a region of the frame is selected based on the amount of motion associated with the region (whether in respect of a given primitive in immediate mode rendering, or all primitives within the region for tile based rendering). For regions associated with intermediate amounts of motion, a higher quality rendering technique is used than for regions associated with low or high amounts of motion. In the examples given, full resolution rendering is used for intermediate amounts of motion, while standard and lower quality CBR are used in respect of low and high amounts of motion respectively. Of course, different rendering techniques may be used, provided that the rendering technique used for regions associated with an intermediate amount of motion is of higher quality i.e. more computing intensive than the rendering techniques associated with low or high amount of motion regions. The rendering techniques used for the low and high amount of motion regions may be the same, or different, as in the embodiments illustrated.

It has been found that where there is relatively little motion within a region of the frame, then there are unlikely to be significant changes from frame to frame within that region, such that a "lower" quality i.e. less computing intensive rendering technique may be applied without significant impact on the perceived image quality. Similarly for frame regions which exhibit a relatively high amount of motion, the user will be less able to perceive any rendering errors, as there will be large changes in the frame region anyway. In such cases, a lower quality rendering technique may be used without detriment to the perceived image quality. On the other hand, for frame regions that exhibit an intermediate amount of movement, higher quality rendering techniques are desirable to result in an image of a suitable quality. The rendering technique used for the intermediate amount of motion regions may be the highest quality technique available e.g. full resolution rendering as in the illustrated examples.

By selecting a rendering technique for regions of a frame based on an amount of motion associated with each region, it is possible to more efficiently render the frame, i.e. in terms of computational power required, while still providing an image of a higher perceived quality.

FIGS. 8A-E illustrate the way in which the technology described herein may be applied to rendering a frame based on the amount of motion of primitives i.e. polygons in regions thereof in a tile based implementation, as described with reference to FIG. 7.

A first frame is shown in FIG. 8A. The tiles making up the frame are indicated. Here, there are 20 tiles within the frame. Four polygons present in the frame are also illustrated. FIG. 8B illustrates the next frame, showing the positions of the polygons in the next frame. It will be seen that the polygons have moved by different amounts. A motion vector can be derived for each polygon. The table in FIG. 8C shows the degree of motion associated with each of the polygons. Polygon 1 is associated with no motion. Polygons 2, 3, and 4 are associated with intermediate, low and high amounts of motion respectively. The amount of motion associated with a polygon may be categorised using the motion vectors determined and a set of thresholds defining motion categories as previously described.

The way in which the frame shown in FIG. 8B may be rendered in accordance with the technology described herein will now be described. In this embodiment, each region is taken to correspond to a tile of the frame. The relationship between the tiles/regions, checkerboard blocks and pixels will be illustrated by reference to FIGS. 8D and 8E. Each tile may be notionally subdivided into a set of checkerboard blocks as illustrated in FIG. 8D. FIG. 8E illustrates the pixels in each tile/region. Each tile/region is made up of 16×16 pixels. Each checkerboard block is made up of 2×2 pixels. It will be appreciated that the size of the tiles and/or checkerboard blocks may vary, and these values are only exemplary.

Each region i.e. tile of the frame shown in FIG. 8B is considered in the manner described by reference to FIG. 7, and the amount of motion associated with the region used to select a rendering technique for the region. Here, the amount of motion of a region is taken to correspond to the amount of motion of a polygon (or part thereof) present within the region, and covering at least a de minimis amount of the region.

The type of rendering technique selected for each region is shown in FIG. 8F.

A number of the regions have no motion associated therewith, as none of the area of the region is covered by a polygon i.e. regions A1, B1, C1, C4. Regions D4 and E4 are also considered to be associated with no motion, as only a de minimis amount of the region is overlapped by polygon 3. Regions A2, B2, C2, A3, B3 and C3 are also associated with no motion, as polygon 1 is associated with no motion. For these no motion regions, no new data is generated, with data being derived based upon previously generated data for the regions. The data for the no motion regions may simply be provided by reusing the previously generated data for the regions, or some form of interpolation may be performed based on the previously generated data.

Regions D1, E1 and D2, E2 are associated with an intermediate amount of motion, in view of the motion of polygon 2. For these regions, CBR is disabled, to result in full resolution rendering within the regions i.e. of all CBR blocks within the region.

Regions D3 and E3 are associated with a low amount of motion corresponding to the motion of polygon 3. In these regions standard checkerboard rendering is performed.

Regions A4 and B4 are associated with a high amount of motion by virtue of the motion of polygon 4. In these regions lower resolution CBR is used.

Accordingly, the quality of rendering technique selected for a tile is dependent upon the amount of motion associated with the tile. The highest quality rendering technique is applied to those regions associated with intermediate amounts of motion.

Figure 9:
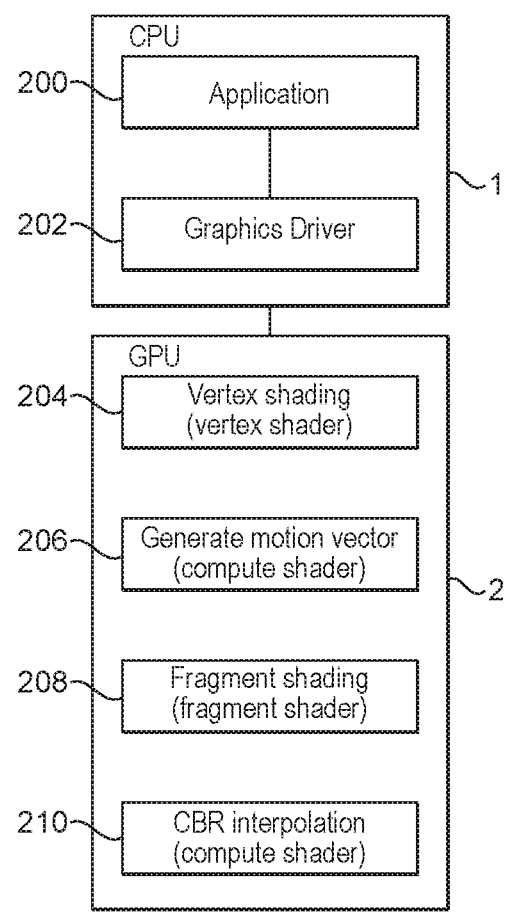
FIG. 9 illustrates a system which may be used to implement certain steps of the methods described herein.

FIG. 9 illustrates where, in a data processing system, the steps of the method may be performed.

FIG. 9 shows an exemplary host processor (CPU) 1 on a which an application 200 is executing that requires a sequence of frames to be rendered by an associated graphics processor (GPU) 2. Accordingly, as shown in FIG. 9, a graphics driver 202 executing on the host CPU 1 will receive commands and data from the application 200 for rendering the sequence of frames and provide appropriate commands and data to the GPU 2 to render the required sequence of frames.

The GPU 2 will then perform the rendering operation, including vertex shading 204 the primitives for a frame, generating motion vectors 206 for the primitives (which may be achieved, for example, by the GPU executing an appropriate compute shader program to generate the motion vectors), generating new data required for frame regions using an appropriate fragment shading process 208 (by executing an appropriate fragment shader program), and deriving 210 any "missing" data for a region in a frame, e.g. by running an appropriate, e.g. "CBR interpolation", compute shader program on the GPU 2.

Other arrangements would, of course, be possible.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system that includes a data processor operable to render a sequence of frames to produce a sequence of frames for display, each frame representing a view of a scene of one or more objects; the method comprising:
   tracking the motion of one or more objects between frames in the sequence of frames;
   and, when a new frame in the sequence of frames is to be rendered;
   for each one of a set of one or more regions of the new frame:
   determining, based on the tracked motion of one or more objects between frames in the sequence of frames, an amount of motion within the region between frames;
   selecting a rendering technique for rendering the region of the new frame from among a plurality of available rendering techniques based upon the determined amount of motion within the region between frames;
   and the data processor rendering the region of the new frame using the selected rendering technique;
   the method comprising:
   assigning each region defined in the frame to one of a set of a plurality of motion categories based upon the amount of motion within the region between frames; and selecting the rendering technique for a region based on the amount of motion category to which the region is assigned, wherein the set of motion categories includes at least a first category in respect of a first amount of motion, and a second category in respect of a second amount of motion.

2. The method of claim 1 wherein said set of one or more regions of the new frame is a set of a plurality of regions.

3. The method of claim 1 wherein each region of the set of one or more regions of the new frame corresponds to a set of one or more tiles that the data processor generates as its output.

4. The method of claim 1 wherein the plurality of motion categories include two or more of: a low amount of motion category; an intermediate amount of motion category; a high amount of motion category; and a no motion category.

5. The method of claim 4 wherein the rendering technique used in respect of the intermediate amount of motion category is a higher quality rendering technique than the rendering technique or techniques associated with the low and high amount of motion categories.

6. The method of claim 4 wherein the rendering technique used in respect of the intermediate amount of motion category is a highest quality rendering technique available to the data processor.

7. The method of claim 1 wherein the available rendering techniques include a plurality of different rendering techniques selected from: checkerboard rendering; full resolution rendering in which a region is rendered to a resolution to match a resolution required for display of the frame; and upscaling rendering.

8. The method of claim 4 wherein checkerboard rendering is used in respect of the low and/or high amount of motion categories.

9. The method of claim 1 wherein checkerboard rendering is used in respect of more than one of the categories, wherein the checkerboard rendering technique used for one category is a checkerboard rendering technique performed at a different rate and/or resolution than that used in respect of another one of the categories.

10. A data processing system comprising:
    a data processor operable to render a sequence of frames to produce a sequence of frames for display, each frame representing a view of a scene of one or more objects;
    a motion tracking processing circuit configured to track the motion of one or more objects between frames in a sequence of frames being rendered by the data processor;
    an amount of motion determining processing circuit configured to determine, when a new frame in a sequence of frames is to be rendered, and based on the tracked motion of one or more objects between frames in the sequence of frames, an amount of motion between frames within each one of a set of one or more regions of the new frame;
    a rendering technique selecting processing circuit configured to select a rendering technique for rendering a region of a new frame from among a plurality of available rendering techniques based upon a determined amount of motion within the region between frames;
    and a control processing circuit configured to control the data processor to render the region of the new frame using the selected rendering technique;
    wherein each region defined in the frame is assigned to one of a set of a plurality of motion categories based upon the amount of motion within the region between frames, and the rendering technique for a region is selected based on the amount of motion category to which the region is assigned, wherein the set of motion categories includes at least a first category in respect of a first amount of motion, and a second category in respect of a second amount of motion.

11. The system of claim 10 wherein said set of one or more regions of the new frame is a set of a plurality of regions.

12. The system of claim 10 wherein each region of the set of one or more regions of the new frame corresponds to a set of one or more tiles that the data processor generates as its output.

13. The system of claim 10 wherein the plurality of motion categories include two or more of: a low amount of motion category; an intermediate amount of motion category; a high amount of motion category; and a no motion category.

14. The system of claim 13 wherein the rendering technique used in respect of the intermediate amount of motion category is a higher quality rendering technique than the rendering technique or techniques associated with the low and high amount of motion categories.

15. The system of claim 13 wherein the rendering technique used in respect of the intermediate amount of motion category is a highest quality rendering technique available to the data processor.

16. The system of claim 10 wherein the available rendering techniques include a plurality of different rendering techniques selected from: checkerboard rendering; full resolution rendering in which a region is rendered to a resolution to match a resolution required for display of the frame; and upscaling rendering.

17. The system of claim 13 wherein checkerboard rendering is used in respect of the low and/or high amount of motion categories.

18. The system of claim 10 wherein checkerboard rendering is used in respect of more than one of the categories, wherein the checkerboard rendering technique used for one category is a checkerboard rendering technique performed at a different rate and/or resolution than that used in respect of another one of the categories.

19. A non-transitory computer readable storage medium storing software code which, when executing on a processor, performs a method of rendering a sequence of frames to produce a sequence of frames for display, each frame representing a view of a scene of one or more objects;

the method comprising:
tracking the motion of one or more objects between frames in the sequence of frames;
and, when a new frame in the sequence of frames is to be rendered;
for a set of one or more regions of the new frame:
determining, based on the tracked motion of one or more objects between frames in the sequence of frames, an amount of motion within the region between frames;
selecting a rendering technique for rendering the region of the new frame from among a plurality of available rendering techniques based upon the determined amount of motion within the region between frames;
and rendering the region of the new frame using the selected rendering technique;
the method comprising:
assigning each region defined in the frame to one of a set of a plurality of motion categories based upon the amount of motion within the region between frames, and selecting the rendering technique for a region based on the amount of motion category to which the region is assigned, wherein the set of motion categories includes at least a first category in respect of a first amount of motion, and a second category in respect of a second amount of motion.

* * * * *